No. 882,968. PATENTED MAR. 24, 1908.
R. M. RUCK.
VARIABLE SPEED DRIVING MECHANISM.
APPLICATION FILED AUG. 10, 1907.

WITNESSES:
N. M. Avery
J. P. Davis

INVENTOR
Richard M. Ruck
BY Munn & Co.
ATTORNEYS

UNITED STATES PATENT OFFICE.

RICHARD MATTHEWS RUCK, OF LONDON, ENGLAND.

VARIABLE-SPEED DRIVING MECHANISM.

No. 882,968.

Specification of Letters Patent.

Patented March 24, 1908.

Application filed August 10, 1907. Serial No. 388,027.

*To all whom it may concern:*

Be it known that I, RICHARD MATTHEWS RUCK, a subject of the King of Great Britain, and resident of 44 Thurloe Square, South Kensington, London, England, have invented certain new and useful Improvements in Variable-Speed Driving Mechanism, of which the following is a specification.

This invention relates to improvements in variable-speed driving mechanism wherein a toothed pinion splined upon a rotary shaft is adapted to gear alternatively with any one of a series of toothed rings fixed side by side upon a common axis, successive rings of the series having progressively varying numbers of teeth of equal pitch, so that the series constitute what may be termed a toothed cone, and the relative angular position of the several rings being such that a straight row of teeth (or of intervals between two adjacent teeth in each ring) extends from end to end of the cone, with the result that the pinion may be caused to pass into gear with successive rings by being shifted along its shaft in either direction through a distance equal to the width of one ring of teeth each time the straight row of teeth is brought, by the revolution of the cone, into the common plane of the axes of the cone and pinion (for the sake of convenience this plane will hereinafter be termed the "transfer plane").

The object of the present invention is to provide means for enabling the shifting of the pinion in the manner described, to be effected mechanically in either direction at will, at the proper moment, and by a movement of the proper amplitude under the control of a single hand lever.

Figure 1:
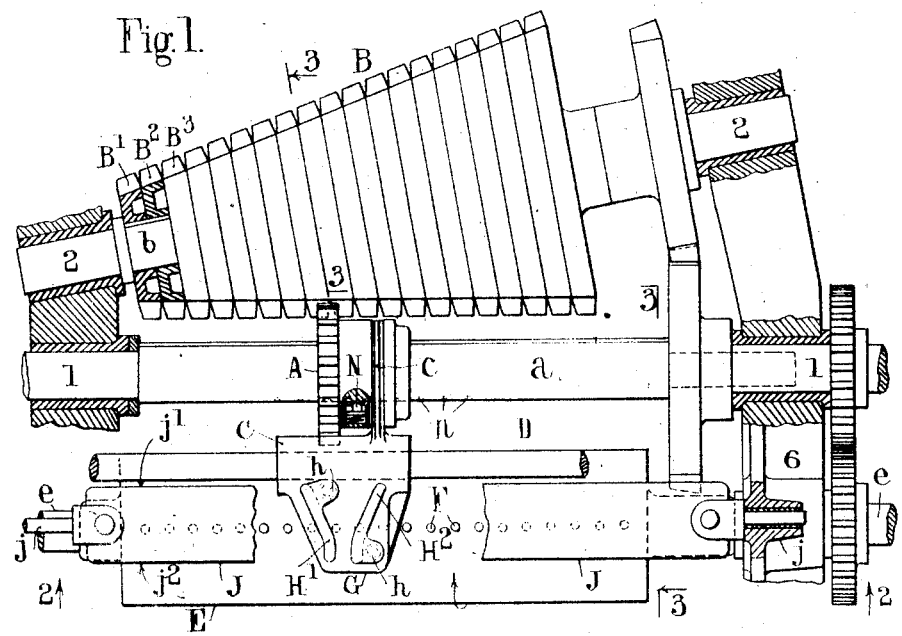
Figure 2:
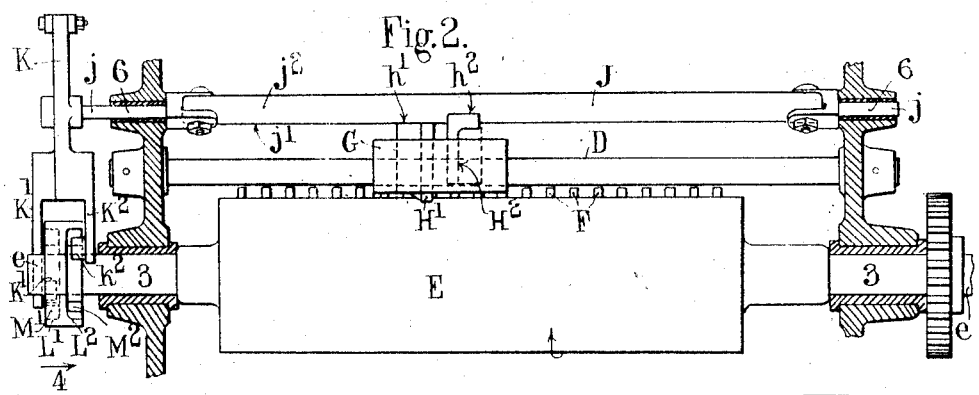
Figure 3:
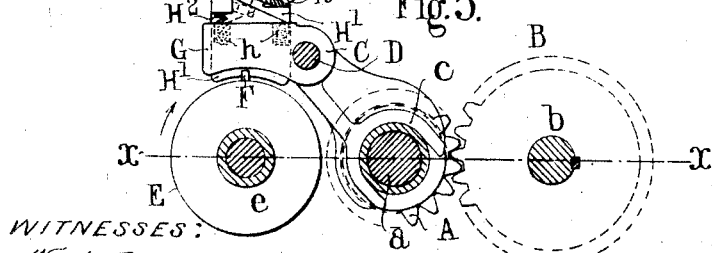
Figure 4:
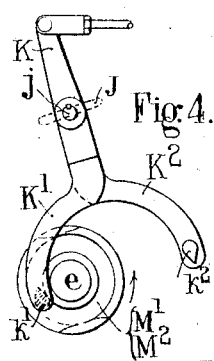

In the accompanying drawings Figure 1 shows the improved variable-speed driving mechanism viewed in a direction at right angles to the "transfer plane", portions being omitted for the sake of clearness, and the pinion being in process of being shifted along the cone. Fig. 2 is a side view looking in the direction of the arrows 2—2 in Fig. 1. Fig. 3 is a section on line 3—3 of Fig. 1. Fig. 4 is an end view looking in the direction of the arrows 4—4 in Fig. 2.

Similar reference letters and numerals indicate corresponding parts in all the figures.

The one member of the variable-speed driving mechanism is a toothed pinion A which is splined upon a shaft $a$ journaled in bearings 1, 1, the other member being a toothed cone B composed of a series of rings $B^1$, $B^2$ $B^3$ etc. fixed side by side upon a shaft $b$ journaled in bearings 2, 2. Successive rings of the series have progressively varying numbers of teeth all of equal pitch with those of the pinion A (the difference in number of teeth between each two adjacent rings being constant throughout the series), and the relative angular position of the several rings is such that a straight row of teeth (or of intervals between two adjacent teeth in each ring) is presented from end to end of the cone. The axis of the pinion shaft $a$ lies in the same plane as that of the shaft $b$ and extends parallel to the pitch surface of the cone B at such a distance therefrom as to enable the pinion A to gear with any one of the rings $B^1$ $B^2$ $B^3$ etc. indifferently, the speed-ratio at which motion is transmitted between the shafts $a$ and $b$ being dependent upon the position of the pinion lengthwise of the cone.

The shifting of the pinion A along the cone B, so as to vary the ratio of the gear as required, is effected through the medium of a slide C movable upon a guide D extending parallel to the pinion shaft $a$, the slide C having a fork $c$ which engages between a pair of collars provided on the boss of the pinion so that the latter will participate in any movement of the slide along the guide D in either direction. Now, since the transference of the pinion from engagement with any one ring of teeth to engagement with either of the adjacent rings of teeth of the cone B can only take place when the straight row of teeth on the cone is in, or passing through, the "transfer plane" (indicated by the line $x$—$x$ in Fig. 3), it is evident that if, while the cone is rotating, it be required to shift the pinion further than to either of those rings of teeth next to the one with which it is already in gear, such shifting movement must not be continuous but must be performed step-by-step in time with the revolutions of the cone, the pinion remaining stationary between the successive steps. Moreover, at each step the shifting movement must both commence and terminate while the straight row of teeth on the cone, in the revolution of the latter, is within a certain limited angular distance from the transfer plane $x$—$x$ and it is of the utmost importance that it should be rendered impossible for the shifting movement, when once begun, to cease until the transfer of the pinion A from full engagement with one to full engagement with the next ring of teeth on the cone has been accomplished. The means for insuring such correctness of action are as follows.

A drum E (carried by a shaft $e$ journaled in bearings 3, 3) is mounted with its axis parallel to the axes of the guide D and pinion shaft $a$, and is provided on its periphery with a straight row of studs F corresponding in number to the toothed rings $B^1$, $B^2$, $B^3$ etc., the distance apart of successive studs being equal to the widths of the several rings. The drum E is driven at an angular velocity corresponding to that of the cone B, so that each time the studs F are passing through a certain angular position the straight row of teeth on the cone B will also be passing through the transfer plane $x$—$x$ the number of revolutions performed by the cone in a given time being made either equal to, or a multiple or sub-multiple of, those performed by the drum E in the same time.

The slide C has an arm G through suitable sockets in which a pair of cams $H^1$ $H^2$, are fitted to slide in a direction radially of the drum E, these cams, which are adapted to be brought into the path of the studs F when required, being normally retracted clear of the drum and its studs by means of springs as at $h$. The cams $H^1$ $H^2$, which are of reverse configuration relatively to one another, are of such effective length and of such oblique form with reference to the path of the studs F that when either of the cams is brought into position to be encountered by the studs, one of the latter will, during the requisite portion of the revolution of the drum E, operate upon the cam so as to produce a movement of the slide C and pinion A equal to the width of one ring of teeth on the cone B, this movement taking place while the straight row of teeth on the cone is passing through the transfer plane $x$—$x$.

The bringing of either of the cams $H^1$ $H^2$ alternatively into operative position is effected by means of a wide bar J which extends parallel to the guide D and is mounted on end trunnions or gudgeons $j$, $j$ journaled in bearings 6, 6 so as to be capable of oscillating about its own longitudinal axis. The cams $H^1 H^2$ are respectively provided with rearward extensions $h^1$, $h^2$ such that on the presser-bar J being canted in the one direction or the other about its longitudinal axis, the edge $j^1$ or $j^2$ of said bar will contact with the cam-extension $h^1$ or $h^2$ and will force the cam $H^1$ or $H^2$ into operative position against the stress of its spring $h$. Hence, when the row of studs F also comes into operative position, that cam which now stands in the path of one of the studs will be struck by the latter and will transmit to the slide C and pinion A movement to the extent of one step (lengthwise of the cone B) in the direction corresponding to the cam $H^1$ or $H^2$ which was actuated. It will be observed that the cam $H^1$ is adapted to produce movement of the pinion A in the direction from the smaller to the larger end of the cone B, while the cam $H^2$ is adapted to cause movement of the pinion in the opposite direction.

The presser-bar J normally occupies a neutral position wherein both of the cams $H^1$, $H^2$ are out of operation, and is oscillated about its axis in either direction as required by means of a three-armed lever fast on one of the gudgeons $j$, one arm K of this lever being coupled to any convenient handle whereby it may be moved in either direction. The other arms $K^1$, $K^2$ of the lever extend at opposite sides of the drum shaft $e$ so as to straddle a disk having a pair of flanges $L^1$ $L^2$ thereon, each arm being adapted to move partly across and just clear of one of the flanges of the disk. From the one side of the one arm $K^1$, and from the opposite side of the other $K^2$ project pallets $k^1$ $k^2$ parallel to the shaft $e$, the pallet $k^1$ carried by the arm $K^1$ intersecting the flange $L^1$ while the pallet $k^2$ carried by the arm $K^2$ intersects the flange $L^2$, and the paths of both pallets being approximately radial with reference to the axis of the shaft $e$.

During that portion of a revolution of the drum E wherein the studs F are capable of engaging either of the cams $H^1$ $H^2$, the oscillation of the presser-bar J about its axis in either direction is prevented by the contact of the pallets $k^1$ $k^2$ with the said flanges, but when in the revolution of the drum E the studs F are out of operative position, the mouths of annular grooves $M^1$ $M^2$, formed on the faces of the disk and opening out at diametrically opposite parts of the periphery of the latter, are brought into registration with the pallets $k^1$ $k^2$ so as to afford a passage for the latter, with the result that the lever arm K may then be actuated so as to rock the presser-bar in whichever direction may be required. Moreover, after the pallet $k^1$ or $k^2$ has entered the groove $M^1$ or $M^2$, the mouth of the groove will be carried round out of registration with the pallet, which will thus be imprisoned in the groove, with the result that the bar J cannot be returned to neutral position until that one of the row of studs F which has meanwhile been operating upon the cam $H^1$ or $H^2$, has completed its work of causing the pinion A to be shifted one step along the cone B.

In order to prevent the pinion A being shifted accidentally (i. e. otherwise than by means of the cam $H^1$ or $H^2$) the boss of the pinion may carry a spring-pressed jumper N adapted, when the pinion A is fully in gear with any ring of teeth on the cone B, to engage in one of a row of V-shaped notches $n$ provided on the shaft $a$; the spring permitting the jumper to yield under the pressure transmitted to the pinion from either of the cams $H^1$, $H^2$, but at all other times causing the jumper to lock the pinion accurately in gear.

with that ring of teeth into engagement with which it was last moved.

It will be obvious that the jumper might be mounted on the slide C and engage with a row of notches on the guide D.

Claims

1. A variable-speed driving mechanism comprising a cone constituted by juxtaposed rings having progressively varying numbers of gear teeth and fixed side by side upon a common axis so that a straight row of teeth extends from end to end of the cone, a toothed pinion movable in the direction of its own axis so as to be capable of gearing with any one of the toothed rings alternatively, a drum mounted to rotate about an axis parallel to that of the pinion at an angular velocity corresponding to that of the cone and carrying a row of studs corresponding in number and distance apart to the number and width of the individual toothed rings of the cone; a slide movable parallel to the axis of the pinion and adapted to shift the pinion lengthwise of the cone; cams carried by the slide and respectively adapted to be brought into position to coact with the studs so as to shift the pinion in one or the other direction; and means for moving either of the cams into and out of said position at the proper moments with reference to the bringing of the straight row of teeth on the cone into the common plane of the axes of the cone and pinion.

2. In variable-speed driving mechanism the combination of a toothed cone, a toothed pinion gearing with the cone, a drum provided with studs, a slide adapted to move parallel to the axis of the pinion; cams mounted side by side so as to be movable radially of the drum carrying the studs and normally held out of engagement with the slide; a presser bar mounted to rock about its longitudinal axis, which is parallel to that of the drum, so as to act alternatively on the respective cams; and means for preventing the rocking of the bar so as to bring either of the cams to operative position or its return, when rocked, to neutral position so as to permit the retraction of the operative cam, excepting at the proper moments with reference to the bringing of the straight row of teeth on the cone into the common plane of the axes of the cone and pinion, substantially as described.

3. In variable-speed driving mechanism, a drum provided with studs, cams mounted side by side so as to be movable radially of the drum, a presser bar, and means for controlling the same, comprising a disk having flanges, a lever having pallets and oscillating as one with the bar but normally prevented from thus moving by the contact of the pallets with the flanges of the disk which rotates as one with the drum, and has each face provided with an annular groove which open out at the periphery of the disk so as to give passage to the pallets when the row of studs on the drum is not in position to act upon the cams, substantially as described.

London July twenty-third 1907.

RICHARD MATTHEWS RUCK.

Witnesses:
A. MAXWELL CLARK,
M. SPIER.